(12) United States Patent
Chen

(10) Patent No.: US 7,631,577 B2
(45) Date of Patent: Dec. 15, 2009

(54) BICYCLE TREADLE DEVICE

(76) Inventor: Chung-I Chen, 235 Chung-Ho Box 8-24, Taipei (TW)

( * ) Notice: Subject to any disclaimer, the term of this patent is extended or adjusted under 35 U.S.C. 154(b) by 331 days.

(21) Appl. No.: 11/710,056

(22) Filed: Feb. 23, 2007

(65) Prior Publication Data

US 2008/0202283 A1 Aug. 28, 2008

(51) Int. Cl.
*B62M 3/00* (2006.01)
*G05G 1/30* (2008.04)
(52) U.S. Cl. .................................... 74/594.6; 74/560
(58) Field of Classification Search ............ 74/560, 74/561, 594.4, 594.5, 504.6, 594.7; 36/161, 36/162; *G05G 1/14, 1/30; B62M 3/00*
See application file for complete search history.

(56) References Cited

U.S. PATENT DOCUMENTS 4,446,754 A * 5/1984 Chattin .................. 74/594.3
6,112,620 A * 9/2000 Chen .................... 74/594.6

* cited by examiner

*Primary Examiner*—Thomas R Hannon
*Assistant Examiner*—James Pilkington

(57) ABSTRACT

A bicycle treadle device comprises a treadle having an axial hole at a center portion thereof; at least one control block being installed at the treadle near the locking sheet; the control block being installed to the treadle; the control block being formed by a main ring; a first protrusion and a second protrusion being protruded from the main ring which has different sizes. By rotating the control block, it can be adjusted so that one of the main ring, the first protrusion and the second protrusion to resist against the front locking sheet of the locking sheet to adjust the expansion of the front locking sheet. Furthermore an adjusting unit is used to change the tightness of the elastic unit of the locking sheet.

6 Claims, 5 Drawing Sheets

BICYCLE TREADLE DEVICE

FIELD OF THE INVENTION

The present invention relates to bicycles, and particularly to a bicycle treadle device, wherein other than the adjusting unit being used to change the tightness of the elastic unit of the locking sheet, a control block is also used to confine the movement of the locking sheet so that the locking sheet can be combined to the toe positioning unit accurately.

BACKGROUND OF THE INVENTION

In the prior art toe positioning unit of a treadle of a bicycle, the treadle is formed with a front clamper and a rear clamper for providing elastic forces to the treadle so as to position the toe positioning unit. When the toe of the user desires to separate from the treadle, the movement of the leg will make the front clamper and the rear clamper to separate from the toe positioning unit so that the toes can leave from the treadle.

However, in driving, the movement of the leg will make the toe positioning unit separating from the treadle, but this is not a desired result.

In another design, a spring is further attached to the treadle. The tightening or releasing of the spring will change the tightness of the front clamper and rear clamper to the treadle.

However, above mentioned spring can still not change the problem that the toe positioning unit separate from the treadle due to normal movement of the leg in driving the bicycle.

Moreover, the adjustment of the spring is not suitable for users because of the applying force of the user and the treading habit of the user.

SUMMARY OF THE INVENTION

Accordingly, the primary object of the present invention is to provide a bicycle treadle device, wherein other than the adjusting unit being used to change the tightness of the elastic unit of the locking sheet, a control block is also used to confine the movement of the locking sheet so that the locking sheet can be combined to the toe positioning unit accurately.

Furthermore by the distance between the locking sheet and the control block, the user can adjust the adjusting unit easily. Thus the adjustment can be performed quickly.

To achieve above objects, the present invention provides a bicycle treadle device comprising: a treadle having an axial hole at a center portion thereof; at least one control block being installed at the treadle near the locking sheet; the control block being installed to the treadle; the control block being formed by a main ring; a first protrusion and a second protrusion being protruded from the main ring; a size of the main ring being greater than that of the second protrusion and the size of the second protrusion being greater than that of the first protrusion; the rotation of the control block will make the main ring, the first protrusion or the second protrusion to be engaged to the locking sheet; and the locking sheet including a front locking sheet and a rear locking sheet for clamping a toe positioning unit; Each of the front locking sheets and rear locking sheets having an approximate U shape; each of the distal ends of the front locking sheets and rear locking sheets having a through hole; the two distal ends of the front locking sheet can be received into the rear locking sheet so that the through hole of the front locking sheet being aligned to the through hole of the rear locking sheet; a screw rod passing through the through holes of the front locking sheet and the rear locking sheet so as to lock the front locking sheet to the rear locking sheet; the screw rod also passing through the treadle so that the front locking sheet and rear locking sheet are pivotally rotated along the screw rod. By rotating the control block, it can be adjusted so that one of the main ring, the first protrusion and the second protrusion to resist against the front locking sheet of the locking sheet so as to adjust the expansion of the front locking sheet.

The various objects and advantages of the present invention will be more readily understood from the following detailed description when read in conjunction with the appended drawing.

DETAILED DESCRIPTION OF THE INVENTION

Figure 1:
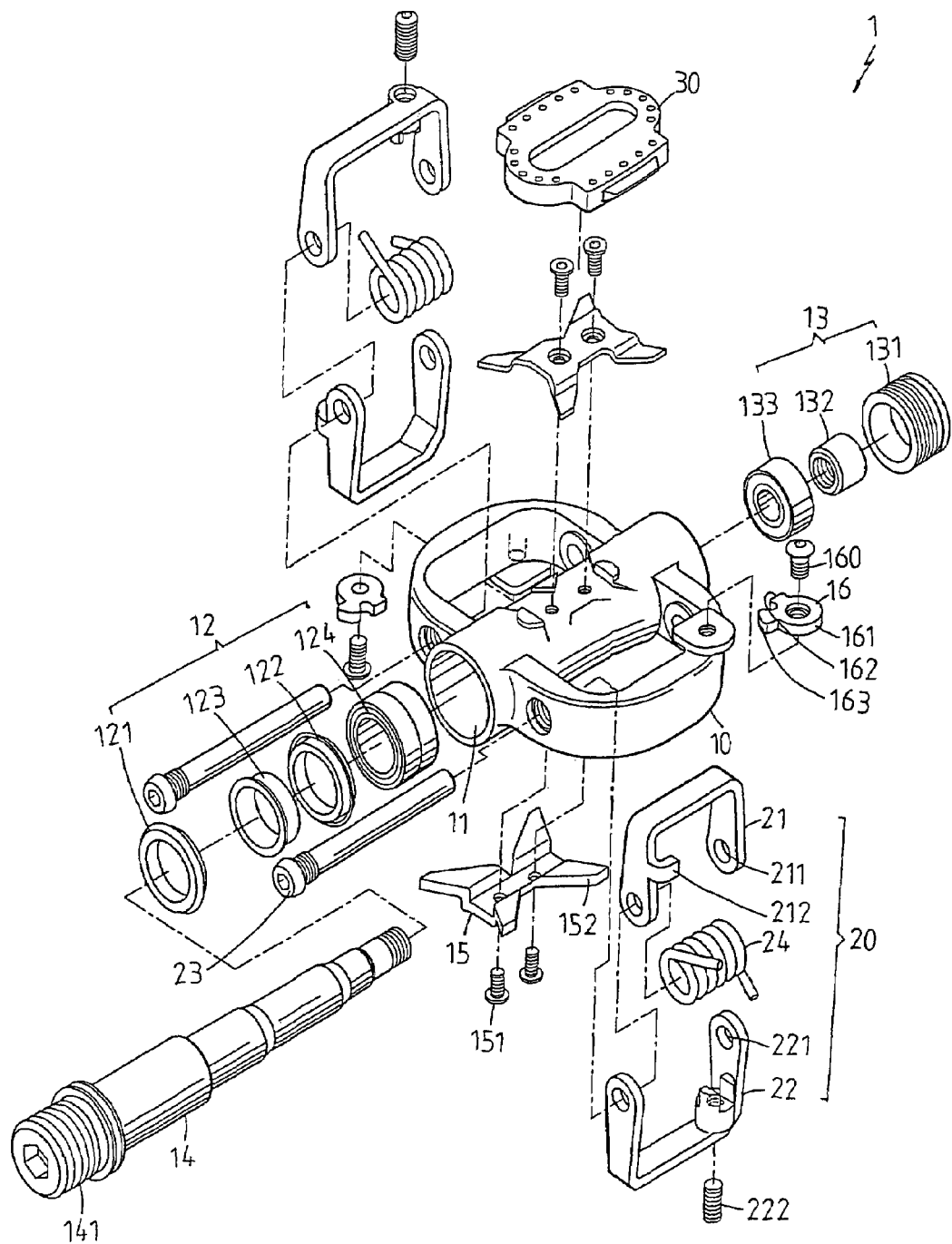
FIG. 1 is an exploded perspective view of the bicycle treadle device of the present invention.

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Referring to FIGS. 1 to 4, the bicycle treadle device 1 of the present invention is illustrated. The treadle device 1 of the present invention has the following elements.

A treadle 10 has an axial hole 11 at a center portion thereof. A bearing set 12, a bearing set 13, and an axial rod 14 is installed within the axial hole 11. The bearing set 12 includes a first oil seal ring 121, a second oil seal ring 122, a washer 123 and a bearing 124. The bearing set 13 includes a rear cover 131, a nut 132, and a bearing 133. The axial rod 14 passes through the bearing set 12 and bearing set 13 to be connected to treadle 10. One combining end 141 of the axial rod 14 exposes out of the treadle 10. The combining end 141 serves for pivotally connecting to a pivotal set of a bicycle.

Each of an upper side and the lower side of the treadle 10 is installed with a positioning plate 15. The positioning plate 15 is locked to the treadle 10 by multiple screws 151. The positioning plate 15 has an X shape. Four ends of the positioning plate 15 respectively have a resisting edge 152 for extended therefrom for abutting against a locking sheet 20.

At least one control block 16 is disposed in one end of the treadle 10 near the locking sheet 20. The at least one control block 16 is installed to the treadle 10. In this embodiment, two control blocks 16 are installed at two opposite ends of the treadle 10. The control block 16 is formed by a main ring 161. A first protrusion 162 and a second protrusion 163 are protruded from the main ring 161. A distance from a center of the main ring 161 to the second protrusion 163 is greater than a distance from the center of the main ring 161 to the first protrusion 162. When rotating the control block 16, the main ring 161, the first protrusion 162 or the second protrusion 163 selectively engages with the locking sheet 20.

Figure 2:
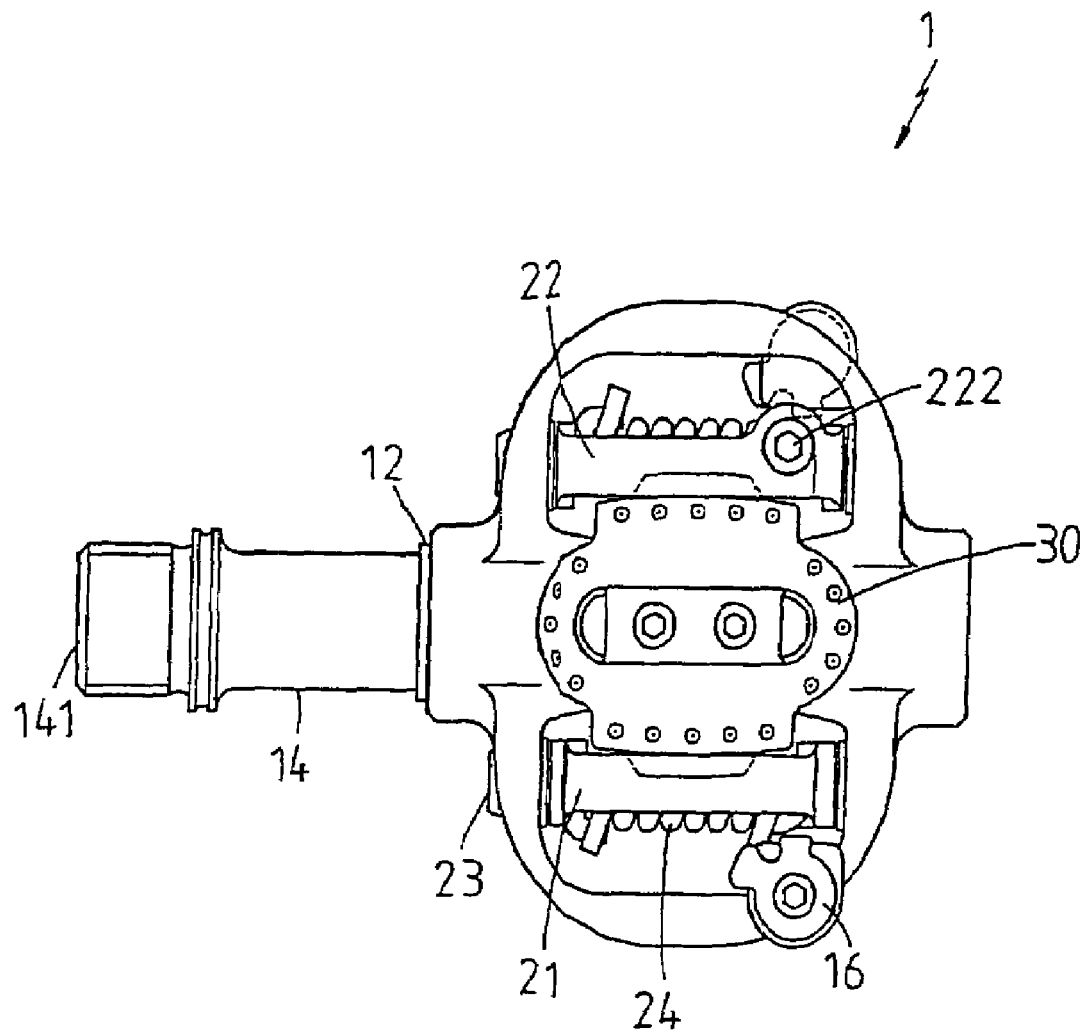
FIG. 2 is an assembled view of the bicycle treadle device of the present invention.
Figure 3:
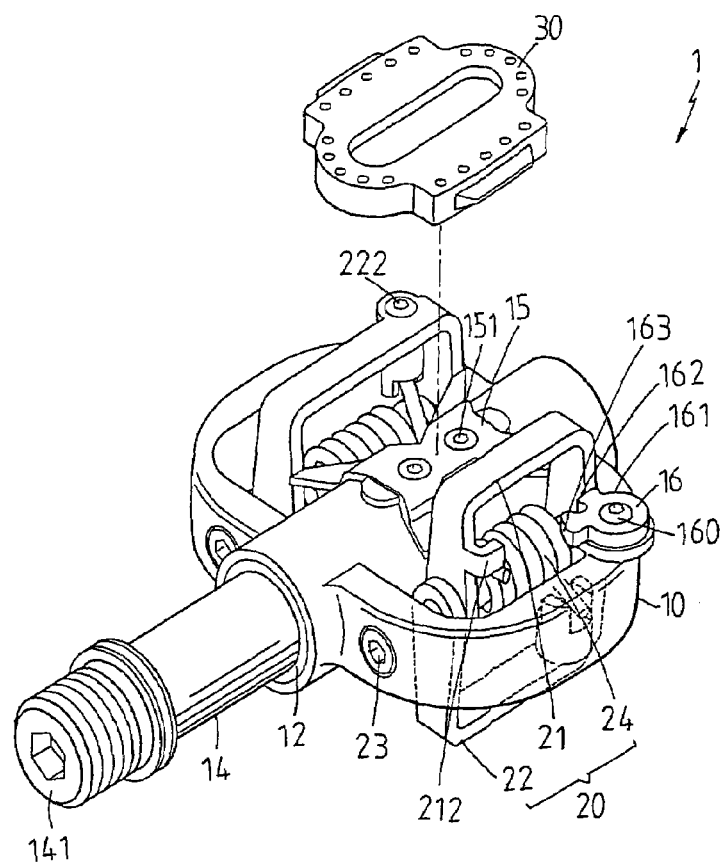
FIG. 3 is another assembled view of the bicycle treadle device of the present invention.

Referring to FIGS. 2 and 3, the locking sheet 20 includes a front locking sheet 21 and a rear locking sheet 22 for clamping a toe positioning unit 30. In this embodiment, there are two front locking sheets 21 and two rear locking sheets 22. Each of the front locking sheets 21 and rear locking sheets 22 has an approximate U shape. Each of the distal ends of the front locking sheets 21 and the rear locking sheets 22 has a through hole 211, 221. The two distal ends of the front locking sheet 21 are received into the rear locking sheet 22 so that the through hole 211 of the front locking sheet 21 is aligned to the through hole 221 of the rear locking sheet 22. A screw rod 23 passes through the through holes 211, 221 so as to lock the front locking sheet 21 to the rear locking sheet 22. Furthermore the screw rod 23 also passes through the treadle 10 so that the front locking sheet 21 and rear locking sheet 22 are pivotally rotated relative to the screw rod 23.

An elastic unit 24 is a spring. The elastic unit 24 is installed between the two through holes 211 of the front locking sheet 21 and the screw rod 23 passes through the elastic unit 24. One end of the front locking sheet 21 has a rib 212. The rib 212 abuts against one end of the elastic unit 24. The rear locking sheet 22 is installed with an adjusting unit 222. The adjusting unit 222 abuts against another end of the elastic unit 24. The adjusting unit 222 serves to tighten or release the elastic unit 24 with respect to the locking sheet 20 so as to adjust the elastic force of the elastic unit 24.

By rotating the control block 16, one of the main ring 161, the first protrusion 162 and the second protrusion 163 selectively abuts against the front locking sheet 21 of the locking sheet 20 such the an expansion of the front locking sheet 21 is determined.

In the present invention, the adjusting unit 222 is provided to adjust the tightening force of the locking sheet 20 and the control block 16 is provided to adjust the expansion of the front locking sheet 21. The control block 16 and the adjusting unit 222 increase the whole effect so that the user has more control means.

Figure 4:
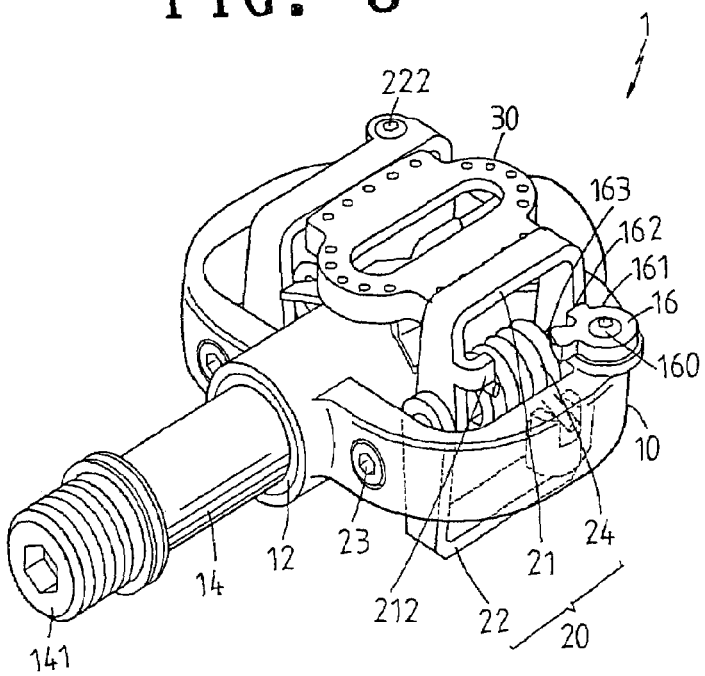
FIG. 4 is a schematic view of the bicycle treadle device of the present invention.
Figure 5:
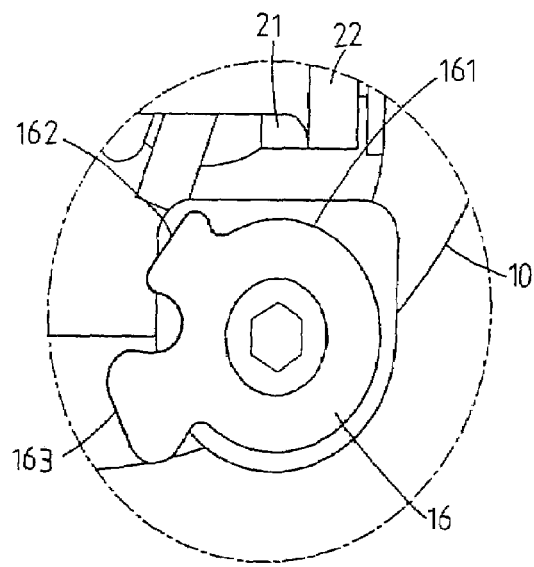
FIG. 5 is a partial enlarged view showing that the main ring of the present invention is corresponding to the locking sheet according to the present invention.
Figures 6, 7:
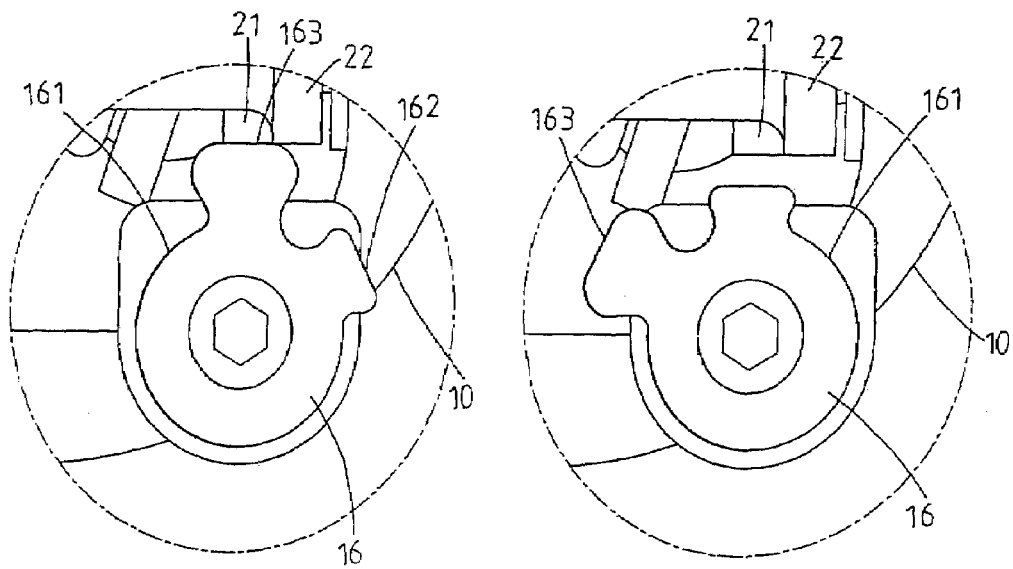
FIG. 6 is a partial enlarged view showing that the first protrusion of the control block is corresponding to the locking sheet according to the present invention.
FIG. 7 is a partial enlarged view showing that the second protrusion of the control block is corresponding to the locking sheet according to the present invention.

In the present invention, referring to FIG. 4, the assembly view is illustrated with a toe positioning unit 30. Referring to FIGS. 5 to 10, the operation of the present invention will be described herein. The FIGS. 5 to 7 are partial enlarged view showing that the locking sheet 20 selectively abuts against the main ring 161, first protrusion 162 and second protrusion 163, respectively.

Figure 8:
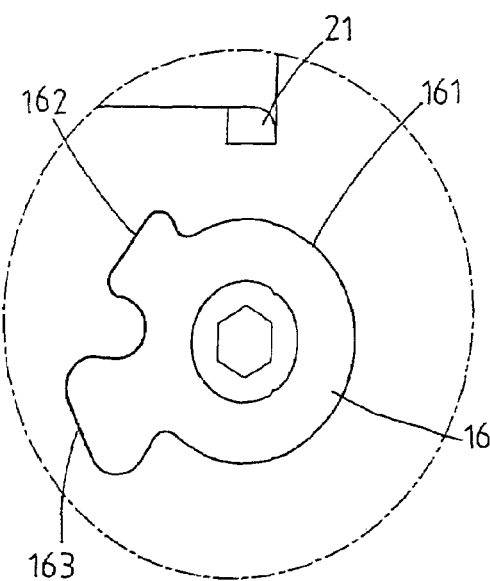
FIG. 8 is a simplified schematic view of FIG. 5 about the bicycle treadle device of the present invention.

Referring to FIGS. 5 and 8, when the control block 16 rotates till the main ring is corresponding to the front locking sheet 21 of the locking sheet 20, a greater distance is existed between the main ring 161 and the front locking sheet 21 for providing a moving space to the front locking sheet 21. That is the confinement to the locking sheet 20 is reduced. The locking sheet 20 has a greater expansion. The toe positioning unit 30 can separate from the treadle 10 easily.

Figures 9, 10:
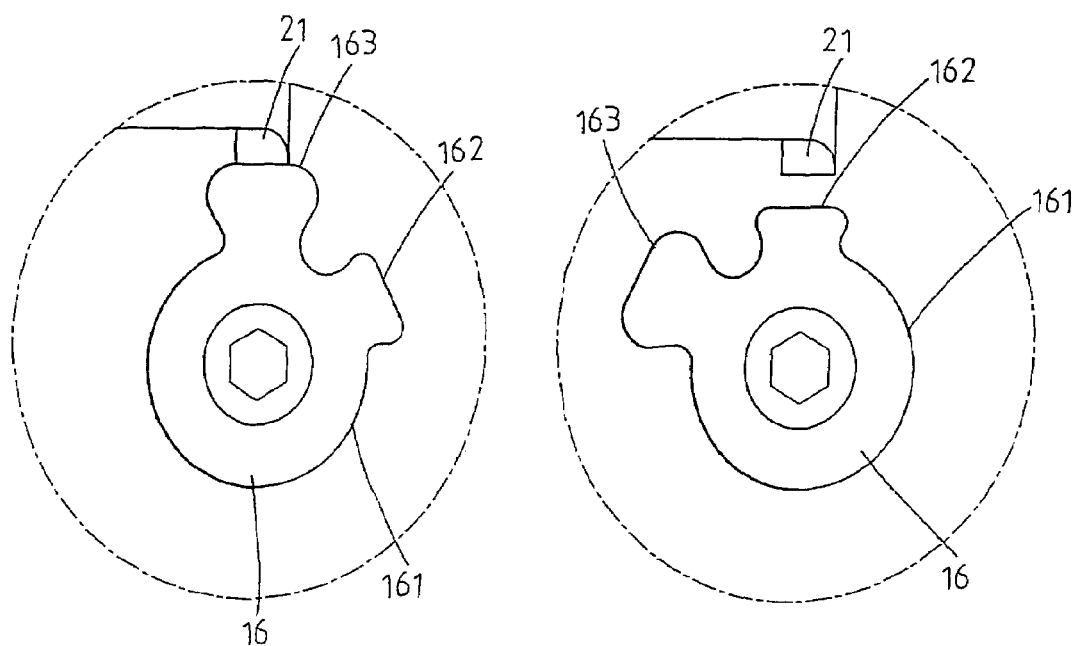
FIG. 9 is another simplified schematic view of FIG. 6 about the bicycle treadle device of the present invention.
FIG. 10 is a further simplified schematic view of FIG. 7 about the bicycle treadle device of the present invention.

With reference to FIGS. 6 and 9, when the first protrusion 162 of the control block 16 is corresponding to the front locking sheet 21, the distance between the front locking sheet 21 and the control block 16 is reduced so that the moving space to the front locking sheet 21 is reduced and thus the confinement to the locking sheet 20 is increased. The toe positioning unit 30 is difficult to separate from the treadle 10.

Referring to FIGS. 7 to 10, when the second protrusion 163 of the control block 16 is corresponding to the front locking sheet 21, the distance between the front locking sheet 21 and the control block 16 is reduced to zero so that the moving space to the front locking sheet 21 is further reduced and thus the confinement to the locking sheet 20 is increased. The toe positioning unit 30 is fixed to the treadle 10.

Thus, in the present invention, other than the adjusting unit 222 being used to change the tightness of the elastic unit 24 of the locking sheet 20, the control block 16, main ring 161, first protrusion 162, and second protrusion 163 are also used to confine the movement of the locking sheet 20 so that the locking sheet 20 can be combined to the toe positioning unit 30 accurately.

Furthermore by the distance between the locking sheet 20 and the control block 16, the user can adjust the adjusting unit easily. Thus the adjustment can be performed quickly.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A bicycle treadle device comprising:

a treadle having an axial hole at a center portion thereof;

at least one control block disposed in one end of the treadle near a locking sheet; the at least one control block having a main ring formed thereof; the at least one control block having a first protrusion and a second protrusion protruded from the main ring; a distance from the second protrusion to a center of the main ring being greater than a distance from the first protrusion to the center of the main ring; and the locking sheet including a front locking sheet and a rear locking sheet for clamping a toe positioning unit; each of the front locking sheet and rear locking sheet having an approximate U shape; two distal ends of the front locking sheet respectively having a through hole; two distal ends of the rear locking sheet respectively having a through hole; the two distal ends of the front locking sheet received in the rear locking sheet so that each through hole in the front locking sheet is aligned to each through hole in the rear locking sheet; a screw rod passing through the through holes of the front locking sheet and the rear locking sheet so as to lock the front locking sheet to the rear locking sheet; the screw rod passing through the treadle so that the front locking sheet and rear locking sheet are pivotally rotated relative to the screw rod;

wherein by rotating the at least one control block, one of the main ring, the first protrusion and the second protrusion selectively abuts against the front locking sheet of the locking sheet such that an expansion of the front locking sheet is determined.

2. The bicycle treadle device as claimed in claim 1 further comprising an axial rod received in the axial hole, the axial rod having a combining end defined in one end thereof, wherein the combining end of the axial rod exposes out of the treadle for pivotally connecting a pivotal set of a bicycle.

3. The bicycle treadle device as claimed in claim 1 further comprising two bearing sets and an axial rod, the axial rod received in the axial hole, the two bearing sets respectively received in one end of the axial hole, one bearing set including a first oil seal ring, a second oil seal ring, a washer and a bearing, the other bearing set including a rear cover, a nut, and a bearing, the axial rod passing the two bearing sets to be connected to the treadle.

4. The bicycle treadle device as claimed in claim 1, wherein each of an upper side and a lower side of the treadle is installed with a positioning plate; each positioning plate is locked to the treadle by multiple screws; each positioning plate has an X shape; four ends of each positioning plate respectively have a resisting edge extended therefrom for abutting against the locking sheet.

5. The bicycle treadle device as claimed in claim 1, wherein two control blocks are installed at two opposite ends of the treadle.

6. The bicycle treadle device as claimed in claim 1 further comprising an elastic unit installed between the two through holes of the front locking sheet, the screw rod passing through the elastic unit, one end of the front locking sheet having a rib, the rib abutting against one end of the elastic unit, an adjusting unit disposed in the rear locking sheet, the adjusting unit abutting against another end of the elastic unit for tightening/releasing the elastic unit with respect to the locking sheet so as to adjust the elastic force of the elastic unit.

* * * * *